United States Patent [19]
Hohnl

[11] Patent Number: 5,361,566
[45] Date of Patent: Nov. 8, 1994

[54] IMPLEMENT BELT DRIVE MECHANISM

[75] Inventor: Gary D. Hohnl, Slinger, Wis.

[73] Assignee: Deere & Company, Moline, Ill.

[21] Appl. No.: 57,723

[22] Filed: May 5, 1993

[51] Int. Cl.$^5$ ............................................. A01D 34/66
[52] U.S. Cl. ............................. 56/11.6; 56/11.8;
56/DIG. 4; 56/DIG. 10; 56/DIG. 22
[58] Field of Search ............... 56/11.6, 11.7, 11.8,
56/13.5, DIG. 3, DIG. 4, DIG. 6, DIG. 9,
DIG. 10, DIG. 22

[56] References Cited

U.S. PATENT DOCUMENTS

| | | | |
|---|---|---|---|
| 3,461,654 | 8/1969 | Plamper | 56/25.4 |
| 4,120,136 | 10/1978 | Rose | 56/17.1 |
| 4,352,210 | 4/1982 | Marto | 56/11.6 |
| 4,779,406 | 10/1988 | Schoeder | 56/15.9 |
| 4,813,215 | 3/1989 | Chase et al. | 56/DIG. 22 X |
| 4,817,728 | 4/1989 | Schmid et al. | 56/DIG. 22 X |
| 4,914,898 | 4/1990 | Jenkins et al. | 56/15.2 |
| 5,012,632 | 5/1991 | Kuhn et al. | 56/11.6 |

OTHER PUBLICATIONS

Sales brochure entitled: "John Deere F500 Series Front Mowers", published by Deere & Co. in 1992, front cover and pp. 1-3.

Parts Catalog entitled: "F510 and F525 Front Mowers", published by John Deere Horicon Works in Oct. 1992, front cover and pp. 60-4, 60-5, 70-16, 70-17, 70-18, 70-19, 70-19A and 70-19B.

Primary Examiner—Terry Lee Melius

[57] ABSTRACT

A belt drive mechanism for transmitting power from a vehicle's power source to a mower deck vertically shiftably coupled with the vehicle, and having a primary belt driven by an output sheave coupled with the vehicle power source, a double pulley jacksheave driven by the primary belt, and a secondary belt driven by the jacksheave and operatively engaged with mower deck sheaves which drive mower blades within the mower deck. A support member extends between the mower deck and the vehicle for supporting the jacksheave, the support member being pivotal with respect to both the mower deck and the vehicle for shifting the position of the jacksheave to a position vertically between the output sheive and the mower deck sheaves as the mower deck shifts vertically. The jacksheave pivots with the support member to assume a tilted position when the mower deck is shifted vertically.

30 Claims, 4 Drawing Sheets

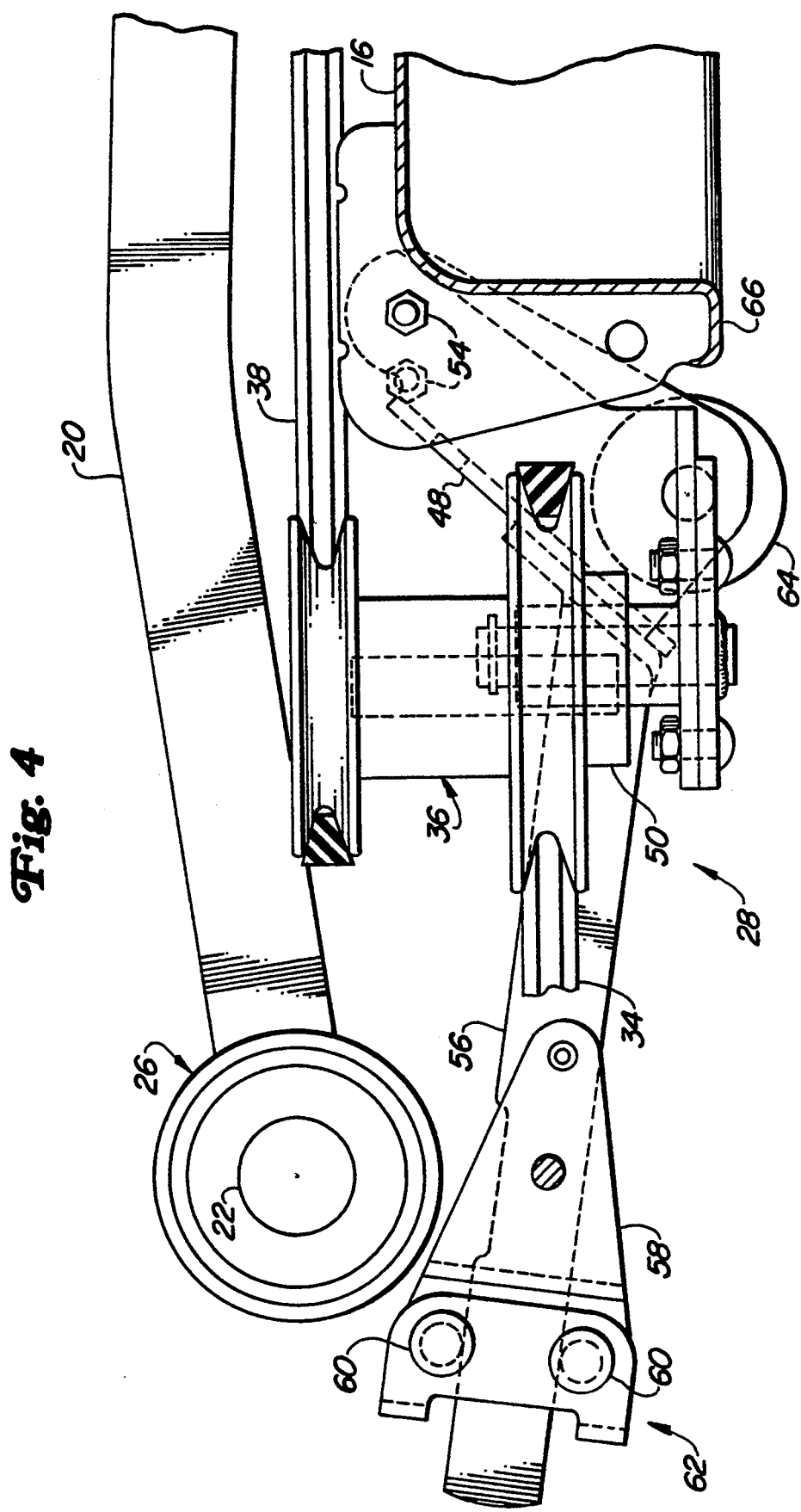

IMPLEMENT BELT DRIVE MECHANISM

BACKGROUND OF THE INVENTION

This invention relates to implements such as mower decks and the belt drive mechanisms which transmit power from a vehicle power source to the mower deck.

Conventional front mounted mower decks are coupled to the front portion of a tractor vehicle, and can be raised or lowered for adjusting the height at which grass is cut. Conventional mower decks are pivotally coupled with the vehicle such that the mower deck can pivot with respect to the vehicle about a horizontal axis. The mower is therefore allowed to ride up and down over ground undulations in close contact with the ground.

Belt drive systems are often utilized for transferring power from the vehicle power source or engine to the mower deck. Conventional belt drive systems include an output sheave coupled with an output shaft driven by the engine. A primary belt extends between the output sheave and a double pulley jacksheave. A secondary belt is operatively coupled with the jacksheave and drivingly engages a plurality of mower deck sheaves. Vertically oriented spindles rotate with the mower deck sheaves. Cutting blades are fixed for rotation with the lower ends of respective spindles for mowing vegetation. The output sheave and the mower deck sheaves are typically not positioned at the same vertical elevation or plane, and therefore the jacksheave acts to transmit the rotational power of the output sheave to the height or elevation of the mower deck sheaves.

The jacksheave of a conventional belt drive mechanism is typically carried by the mower deck. Therefore, as the deck shifts up and down during adjustments of the cutting height or when ground undulations are encountered the jacksheave carried by the deck will shift up and down with respect to the vehicle. Since the jacksheave and mower deck sheaves are both carried by the mower deck, the jacksheave and mower deck sheaves remain properly aligned when the mower deck pivots with respect to the vehicle. However, when the deck shifts vertically the jacksheave shifts vertically out of alignment with the output sheave. The primary belt must therefore extend at an angle between the output sheave and the jacksheave. The primary belt therefore engages the output sheave at an angle to the plane in which the output sheave is rotating. Also, the primary belt engages the pulley of the jacksheave at an angle to the plane in which the jacksheave pulley is rotating. As these belt angles get large, the belts can wear relatively quickly as the belt contacts the pulleys. The belt may eventually fail due to wear, causing downtime and repair expense. Also, when a belt engages a pulley at a relatively large angle the belt is more prone to jump off the pulley, causing interruption to operation.

It would therefore be desirable to provide a belt drive mechanism for driving an implement such as a mower deck and which reduces or eliminates problems associated with sheave misalignment and excessive belt angles.

SUMMARY OF THE INVENTION

The preferred embodiment of the present invention provides a belt drive system for driving the blades of a mower deck. A double pulley jacksheave is positioned between the deck and the vehicle. The jacksheave is pivotally coupled to the deck and to the vehicle for pivoting motion as the cutting height is adjusted and as the mower deck rises and falls over ground undulations. An engine output pulley, a primary belt, the double pulley jacksheave, a secondary belt and mower deck sheaves transmit power to mower blades which rotate within the deck to cut grass and vegetation. The jacksheave is carried by a support member which is pivotally coupled to the deck via a hinge coupling or first pivotal connection. An arm extends rearwardly from the support member and is generally loosely received by a bracket and pins which act as a second pivotal connection. The pivotal connections allow the support member and jacksheave to pivot as the deck shifts vertically, and thereby serve to position the jacksheave between the elevations of the output sheave and the mower deck sheaves. Both the primary and secondary belts therefore assume relatively small angles with respect to the various pulleys. By shifting the jacksheave vertically to a position between the elevations of the vertically misaligned pulleys, the effective horizontal distance available for the belts to compensate for the vertical misalignment of the sheaves is relatively large, and therefore the angle of the belts is relatively small. Wear in the belts as they contact the various sheaves is thereby reduced, and the belts will tend not to come off the sheaves as frequently. The pivoting of the support member as the deck shifts vertically also serves to tilt the jacksheave to thereby align the pulleys of the jacksheave more closely with the tilted or angled belts. Belt wear is thereby reduced, and the belts will become disengaged from the pulleys less frequently. The preferred embodiment therefore provides a belt drive mechanism for driving a mower deck and which reduces or eliminates problems associated with sheave misalignment and excessive belt angles.

BRIEF DESCRIPTION OF THE DRAWINGS

FIG. 4 is a side view of the belt-and-pulley mechanism with the mower deck set generally at the midpoint of its range of cutting heights.

DESCRIPTION OF THE PREFERRED EMBODIMENT

Figure 1:
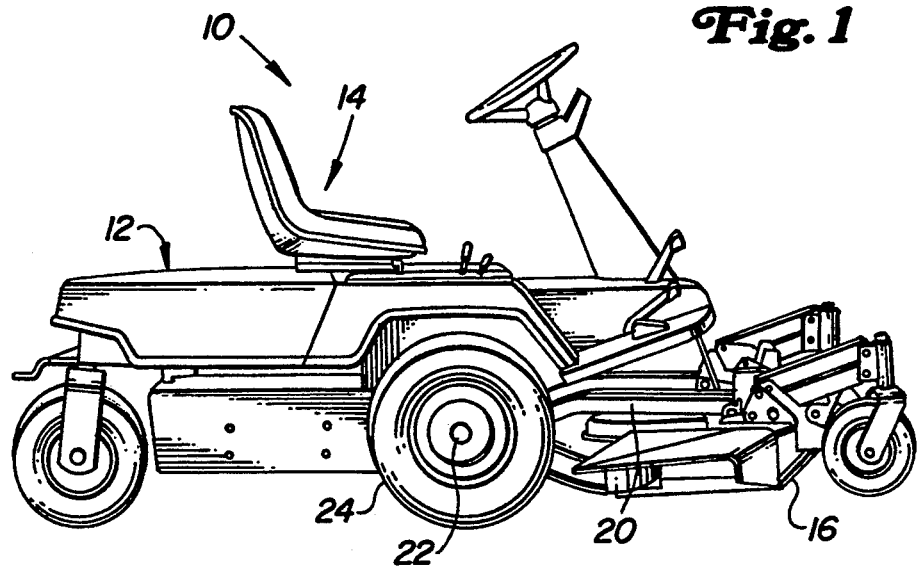
FIG. 1 is a perspective view of a vehicle having a front mounted mower provided with the present invention.
Figure 3:
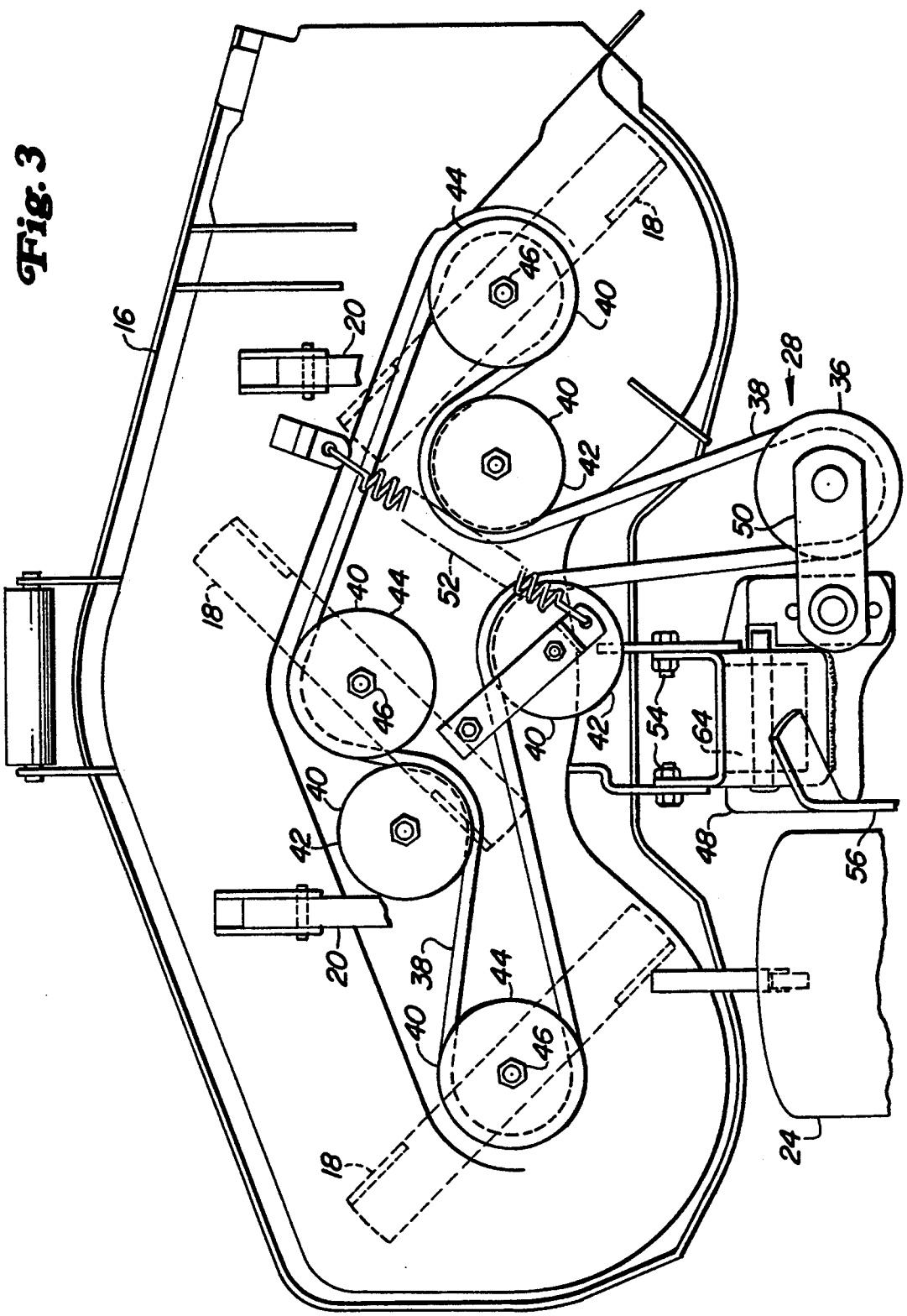
FIG. 3 is a plan view of the front mounted mower deck and belt-and-pulley mechanism according to the preferred embodiment.

Referring now to FIG. 1, there is shown a tractor vehicle 10 which includes the preferred embodiment of the present invention. A power source 12 such as an engine is carried by the vehicle 10 behind the vehicle's operator station 14. The vehicle 10 is provided with a front mounted mower deck 16. Mower blades 18, as best seen in FIG. 3) rotate within the deck 16 to cut grass and vegetation as the vehicle 10 travels forward. The mower deck 16 is coupled to the vehicle 10 via push arms 20 which are pivotally coupled to the vehicle 10 near the axles 22 of the vehicle's front wheels 24. The pivotal connection 26 of the push arms 20 to the vehicle 10 allows the push arms 20 and mower deck 16 to pivot up and down with respect to the vehicle 10 as the deck 16 encounters ground undulations during operation.

A conventional height of cut adjustment mechanism (not shown) is provided for allowing an operator to selectively raise and lower the mower deck 16 to vary the cutting height. The cutting height adjustment mechanism also maintains the mower deck 16 in a generally level or horizontal position when the deck 16 is shifted to a new cutting height. The height of cut adjustment mechanism of the preferred embodiment is substantially similar to the mechanism provided on John Deere F525 front mowers.

Figure 2:
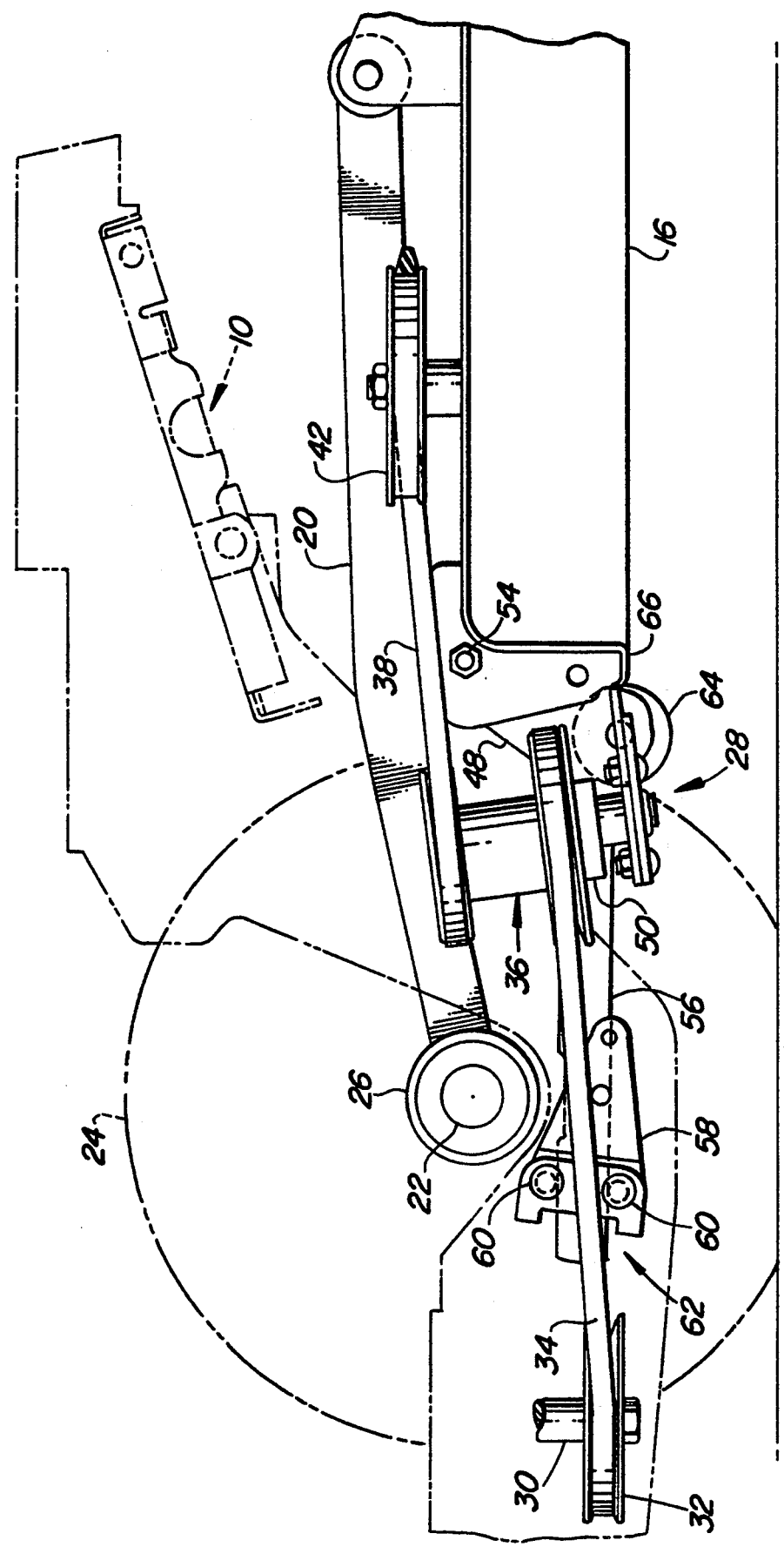
FIG. 2 is a side of the belt-and-pulley mechanism according to the preferred embodiment and with the deck positioned at a relatively high cutting height.

The vehicle 10 is provided with a belt-and-pulley mechanism 28 (as shown in FIGS. 2-5) which transmits rotational power from the engine 12 to the mower blades 18. As seen in FIG. 2, a vertically extending output shaft 30 extends downwardly from the engine 12, and an output sheave 32 is fixed for rotation with the lower end portion of the output shaft 30. A primary belt 34 is driven by the output sheave 32 and engages a double pulley jacksheave 36. A secondary belt 38 is driven by the jacksheave 36 and engages a plurality of mower deck sheaves 40, as best seen in FIG. 3. A pair of idler pulleys 42 are carried by the deck 16, and one of the idler pulleys 42 acts to tension the secondary belt 38. A plurality of mower blade sheaves 44 are fixed to vertically aligned blade spindles 46. Mower blades 18 coupled to the lower portions of the blade spindles 46 are operatively driven by the vehicle's belt-and-pulley mechanism 28 for rotation within the mower deck 16 to thereby cut vegetation and grass. As the output sheave 32 is driven by the engine 12, the rotational energy of the sheave 32 is transmitted to the mower blades 18 via the primary belt 34, jacksheave 36, secondary belt 38, mower deck sheaves 40 and spindles 46.

Figure 5:
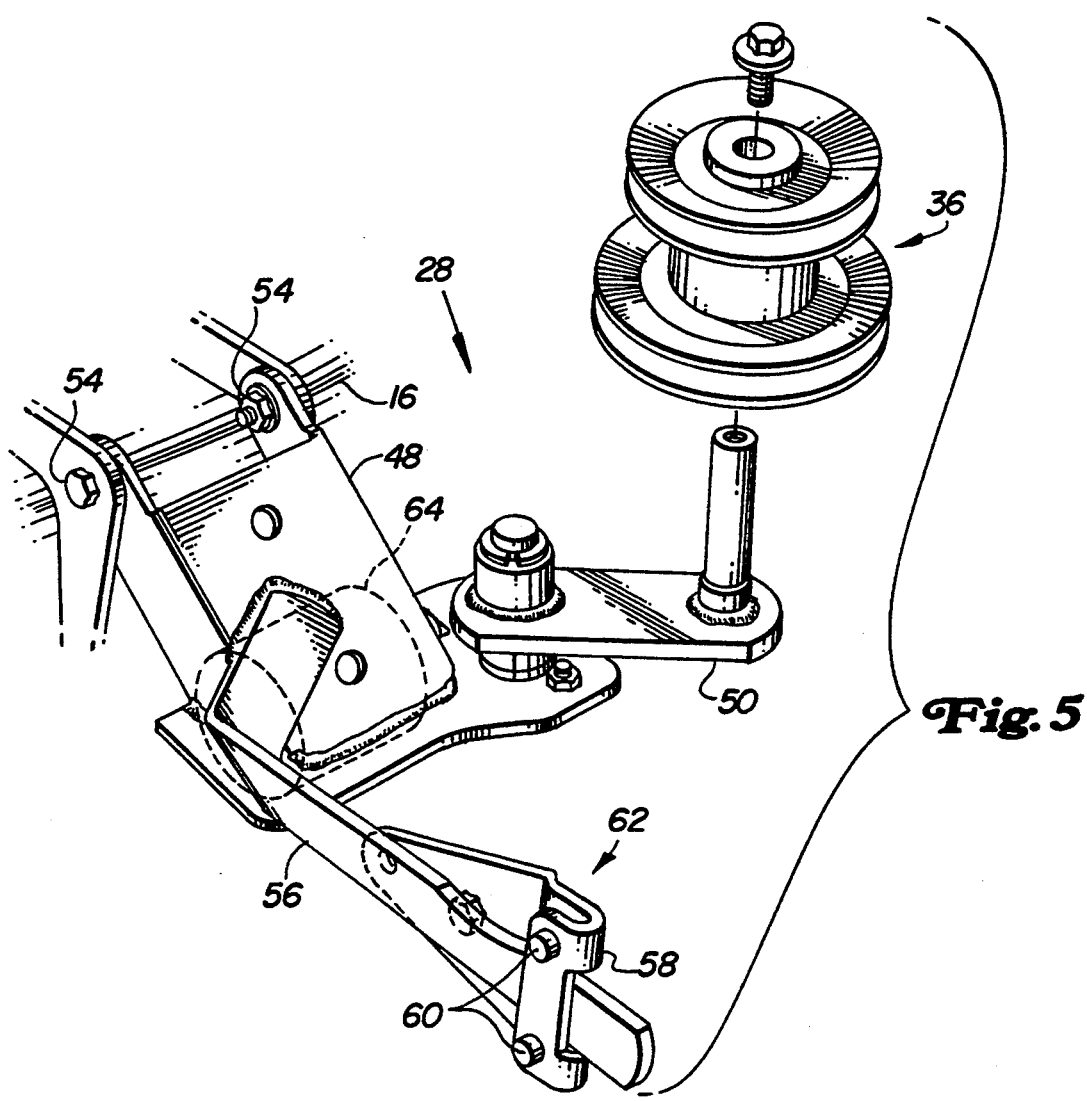
FIG. 5 is perspective and partially exploded view of the support member and double-pulley jacksheave according to the preferred embodiment of the present invention.

The preferred embodiment acts to reduce or eliminate excessive misalignment of the belts 34 and 38 with respect to the various pulleys when the cutting height of the mower deck 16 is raised or lowered. As seen in FIGS. 2-5, a support means or support member 48 is carried between the mower deck 16 and the vehicle 10. A swing arm 50, as best seen in FIG. 5, is pivotally coupled to the support member 48 for rotatably carrying the jacksheave 36. The support member 48 and swing arm 50 thereby support the jacksheave 36 between the mower deck 16 and vehicle 10. As shown in FIG. 3, a biasing spring 52 urges one of the idler sheaves 42 to tension the secondary belt 38. This tension in the secondary belt 38 urges the swing arm 50 and jacksheave 36 to pivot forwardly about a generally vertical axis with respect to the support member 48 to put tension in the primary belt 34. A hinge coupling or first pivotal connection 54, as best seen in FIG. 5, couples the support member 48 to the mower deck 16. The hinge coupling 54 defines a generally horizontal and laterally extending axis about which the support member 48 pivots with respect to the deck 16 as the deck 16 shifts vertically.

A second pivotal connection 62 (as shown in FIGS. 2, 4 and 5) is provided for coupling the support member 48 with the vehicle 10. An arm member 56 is rigidly fixed to the support member 48 and extends rearwardly therefrom. A bracket member 58 coupled with the vehicle 10 at a location rearwardly of the support member 48 includes a pair of pins 60 which act as rolling bearing surfaces for slidably receiving the rear portion of the arm member 56. The bracket 58 and pins 60 act as an opening within which the arm member 56 is received. The bracket member 58 and pins 60 couple the support member 48 to the vehicle 10, and act as the second pivotal connection 62. The arm member 56 is generally loosely received by the opening defined by the bracket 58 and pins 60 such that the arm member 56 is allowed to slide in the direction of its longitudinal axis as the mower deck 16 shifts vertically during cutting height adjustments. Furthermore, the pins 60 and bracket 58 receive the arm member 56 in a loose enough fashion to allow the arm member 56 to pivot up and down as the deck 16 shifts vertically.

As the operator raises the mower deck 16 to increase the cutting height, the deck 16 shifts vertically upwardly with respect to the vehicle 10. The mower deck idler sheaves 42 shift upwardly with the deck 16, and therefore shift upwardly with respect to the output sheave 32 as the cutting height is raised. The pivot axis defined by the hinge connection 54 also rises with the deck 16, and the front portion of the support member 48 which is coupled with the hinge connection 54 therefore rises with the deck 16. The entire support member 48 therefore pivots downwardly about the hinge connection 54 as the deck 16 rises. The second pivotal connection 62 accommodates the motion of the support member 48 by allowing the arm member 56 to slide forwardly within the pins 60 and bracket 58 and by allowing the arm member 56 to pivot within the second pivotal connection 62.

As the deck 16 rises to a position as shown in FIG. 2, the jacksheave 36 shifts upwardly with respect to both the vehicle 10 and the output sheave 32 as the support member 48 is pivotally lifted by the shifting deck 16. However, the jacksheave 36 is positioned to the rear of the hinge connection's pivot axis, and the jacksheave pivots downwardly with respect to the deck. The jacksheave 36 therefore rises only a portion of the distance that the deck 16 is lifted, and becomes positioned at a height between the vertical positions of the output sheave 32 and the mower deck idler sheaves 42. By positioning the jacksheave 36 at an elevation between the output sheave 32 and the idler pulleys 42, both the primary and secondary belts 34 and 38 engage the respective output sheave 32 and deck sheaves 42 at relatively small angles, as seen in FIG. 2.

Positioning the jacksheave 36 between the elevations of the output sheave 32 and the mower deck idler sheaves 42 serves to effectively lengthen the longitudinal distance available for the belts 34 and 38 to overcome the vertical misalignment of the sheaves 32 and 42. The preferred embodiment makes available the entire distance between the output sheave 32 and the idler pulleys 42 as seen in FIG. 2. Since the preferred embodiment provides a relatively large longitudinal distance available for the belts 34 and 38 to span the vertical misalignment of the output sheave 32 and idler sheaves 42, the angle of the misalignment of the belts 34 and 38 is relatively small. Conventional mechanisms which provide a jacksheave rigidly fixed with the deck have primary belts which, acting alone, must accommodate the entire difference in elevation between the vehicle's output sheave and the mower deck's jacksheave and deck sheaves. The jacksheave of a conventional mechanism is positioned relatively close to the output sheaves and therefore the longitudinal distance over which vertical sheave misalignment must be overcome is relatively small. The resulting angle of the primary belt of a conventional mechanism is therefore relatively large. The present invention effectively lengthens the longitudinal distance over which the belts 34 and 38 are angled, resulting in each of the belts 34 and 38 encountering only relatively minor or small belt angles.

Furthermore, as the deck 16 is raised, the support member 48 pivots about the hinge coupling 54, thereby pivoting or tilting the pulleys of the jacksheave 36 out of a horizontal plane, as seen in FIG. 2. This tilting of the jacksheave 36 within a vertical plane serves to more closely align the pulleys of the jacksheave 36 with the inclinations of the respective primary and secondary belts 34 and 38. Therefore, the primary and secondary belt angles with respect to the jacksheave pulleys are reduced due to the pivoting or tilting of the jacksheave 36. Wear caused by contact of the belts 34 and 38 against the jacksheave pulleys is thereby reduced.

The preferred embodiment of the present invention is adjustable between 1 inch and 4 inch cutting heights. When the mower deck 16 is set at a 2.5 inch cutting height there is generally no belt misalignment in either the primary or secondary belts 34, 38, and the pulleys of the jacksheave 36 are rotating in generally horizontal planes, as seen in FIG. 4. When the deck height is increased as discussed above, the belts 34 and 38 become angled and slightly misaligned as seen in FIG. 2, and the jacksheave 36 tilts out of the horizontal plane. Similarly, when the deck 16 is adjusted downwardly to decrease the cutting height, some belt angling and slight misalignment will occur, and the jacksheave pulleys will tilt out of the horizontal planes but in the opposite direction than when the deck 16 is raised.

The preferred embodiment also acts to reduce belt misalignment as the deck 16 and push arms 20 pivot with respect to the vehicle 10 when ground undulations are encountered. During forward mowing operations when the deck 16 encounters an up-slope or hill, the deck 16 and push arms 20 pivot upwardly about the push arms' pivotal connection 26 with the vehicle. As this happens, the mower deck sheaves 40 shift vertically upwardly with respect to the output sheave 32, causing further misalignment of the pulleys 32 and 42. However, the hinge connection 54 will pull or pivot the front portion of the support member 48 upwardly with the deck 16. The jacksheave 36 which is carried by the support member 48 to the rear of the hinge connection 54 will therefore be shifted upwardly to a location between the elevations of the output sheave 32 and idler pulleys 42. Therefore both belts 34 and 38 help overcome the vertical displacement of the mower deck sheaves 40. The horizontal distance available for the belts 34 and 38 to overcome the vertical displacement of the sheaves 32 and 42 extends the entire distance between the output sheave 32 and the idler pulleys 42, and is therefore relatively large. The belt angles of the primary and secondary belts 34 and 38 are therefore relatively small.

The preferred embodiment provides first and second pivotal connections 54 and 62 which are positioned fore and aft, respectively, of the push arms' pivotal connection 26 to the vehicle 10. In particular, the first pivotal connection or hinge coupling 54 is positioned in front of the push arms' pivot axis 26. The second pivotal connection's pivot point defined by the bracket 58, pins 60 and arm member 56 is positioned to the rear of the push arm's pivot axis 26. When configured in this manner, the support member 48 will pivot upwardly when the deck 16 and push arms 20 pivot upwardly over ground undulations, but will not pivot to the same angle as the push arms 20 and deck 16. The support member 48 and jacksheave 36 will assume a position at an angle between the horizontal plane of the output sheave 32 and the tilted planes of the mower deck sheaves 40, deck 16 and push arms 20. By assuming an intermediate angle, the jacksheave 36 according to the preferred embodiment effectively splits or distributes the belt misalignment between both belts 34 and 38. Also, by shifting to an elevation between the output sheave 32 and the idler pulleys 42 the jacksheave 36 effectively lengthens the horizontal distance available for the belts 34 and 38 to overcome the vertical misalignment of the sheaves 32 and 42. Both of these factors, the pivoting and the vertical shifting of the support member 48 and jacksheave 36, contribute to reduction of belt misalignment by the preferred embodiment.

The preferred embodiment provides a roller 64 carried by the support member 48 near the lower edge 66 of the deck 16. When the deck 16 is adjusted to low cutting heights the roller 64 pivots upwardly with the support member 48 about the hinge connection 54 and upwardly with respect to the bottom edge 66 of the deck 16. At low cutting heights the roller 64 extends only a small distance below the bottom edge 66 of the deck 16, and therefore does not interfere with short cutting operations. When the deck 16 is raised to its high cutting heights the roller 64 pivots downwardly with the support member 48 about the hinge connection 54 and downwardly with respect to the bottom edge 66 of the deck 16. At high cutting heights the roller 64 therefore extends a relatively large distance beneath the bottom edge 66 of the deck 16 to thereby not only prevent the bottom rear edge 66 of the deck 16 from gouging the ground but also to help prevent the mower from cutting grass on the crest of the hill undesirably short. The position of the roller 64 with respect to the lower edge 66 of the deck 16 is automatically adjusted as the support member 48 pivots in response to the deck's cutting height being adjusted, thereby eliminating the need for the operator to manually adjust the roller. Conventional mowers, on the other hand, typically include rollers held in a fixed position corresponding to the lowest cutting heights. Therefore, when conventional decks are raised to higher cutting heights their rollers prevent gouging but allow grass on the crests of small hills to be cut at an undesirably low height.

I claim:

1. A belt drive mechanism for transmitting power from a vehicle's power source to an implement vertically shiftably coupled with the vehicle, comprising:
   a primary belt driven by the vehicle power source,
   a double-pulley jacksheave driven by the primary belt and supported by a support member, said support member and jacksheave supported thereby being pivotable with respect to the implement and the vehicle within a generally vertical plane, and
   a secondary belt driven by the double-pulley jacksheave and drivingly engaged with at least one implement sheave.

2. The invention of claim 1, wherein said support member includes a first pivotal connection with the implement and a second pivotal connection with the vehicle.

3. The invention of claim 2, wherein one of said pivotal connections also allows the support member to slide relative to said pivotal connection as the implement shifts vertically.

4. A belt drive mechanism for transmitting power from a vehicle's power source to an implement vertically shiftably coupled with the vehicle, comprising:
   a primary belt driven by the vehicle power source,
   a jacksheave driven by the primary belt,
   a secondary belt driven by the jacksheave and operatively engaged with at least one implement sheave,
   a support member for supporting the jacksheave, said support member having a first pivotal connection with the implement and a second pivotal connection with the vehicle.

5. The invention of claim 4, wherein:
   one of said pivotal connections also allows the support member to slide relative to said pivotal connection as the implement shifts vertically.

6. The invention of claim 4, wherein:
   said implement is coupled with the vehicle for pivotal motion about a generally horizontal pivot axis,
   one of said first and second pivotal connections is positioned in front of the implement's pivot axis and the other pivotal connection is positioned to the rear of the implement's pivot axis.

7. The invention of claim 4, wherein
   an output sheave is operatively coupled with the power source for driving the primary belt, said output sheave having a fixed vertical position with respect to the vehicle,
   said at least one implement sheave being vertically shiftable with the implement for being shiftable to a plurality of vertical positions with respect to the vehicle and output sheave, and
   the support member vertically shifts the jacksheave to a position between the vertical positions of the output sheave and the implement sheave when the implement is shifted vertically.

8. The invention of claim 4, wherein:
   said first pivotal connection further comprises a hinge coupling which allows the support means to pivot with respect to the implement about a horizontal axis,
   said second pivotal connection further comprises an arm member having a longitudinal axis extending from the support member, said arm member being received within an opening defined by the vehicle for sliding within the opening generally in the direction of the arm's longitudinal axis, said arm also being pivotable within the opening when the implement shifts with respect to the vehicle.

9. The invention of claim 4, wherein said jacksheave pivots with the support member to assume a tilted position when the implement is shifted vertically.

10. The invention of claim 4, and further comprising a swing arm coupled between the jacksheave and the support member for allowing the jacksheave to pivot with respect to the support member about a generally vertical axis.

11. A belt drive mechanism for transmitting power from a vehicle's power source to an implement which is vertically shiftably coupled with the vehicle, comprising:
   a primary belt driven by an output sheave coupled with the vehicle power source,
   a jacksheave driven by the primary belt,
   a secondary belt driven by the jacksheave and operatively engaged with implement sheaves,
   a support member extending between the implement and the vehicle for supporting the jacksheave, said support member being pivotal with respect to both the implement and the vehicle for shifting the position of the jacksheave to a position vertically between the output sheave and the implement sheaves as the implement shifts vertically.

12. The invention of claim 11, wherein said jacksheave pivots with the support member to assume a tilted position when the implement is shifted vertically.

13. The invention of claim 11, wherein
   said support member is coupled with the implement via a first pivotal connection and is coupled with the vehicle via a second pivotal connection, and
   one of said pivotal connections also allows the support member to slide relative to said pivotal connection as the implement shifts vertically.

14. The invention of claim 13, wherein:
   said implement is coupled with the vehicle for pivotal motion about a pivot axis,
   said first and second pivotal connections are positioned fore and aft of the implement's pivot axis.

15. The invention of claim 11, wherein:
   the support member is coupled with the implement via a hinge coupling which allows the support member to pivot with respect to the implement about a horizontal axis,
   the support member is coupled with the vehicle via an arm member having a longitudinal axis extending from the support member, said arm member being received within an opening defined by the vehicle for sliding within the opening generally in the direction of the arm's longitudinal axis, said arm also being pivotable within the opening when the implement shifts with respect to the vehicle.

16. The invention of claim 11, and further comprising a swing arm coupled between the jacksheave and the support member for allowing the jacksheave to pivot with respect to the support member about a generally vertical axis.

17. A belt drive mechanism for transmitting power from a vehicle's power source to a mower deck vertically shiftably coupled with the vehicle, comprising:
   a primary belt driven by an output sheave coupled with the vehicle power source,
   a jacksheave driven by the primary belt,
   a secondary belt driven by the jacksheave and operatively engaged with mower deck sheaves which drive mower blades within the mower deck,
   a support member extending between the mower deck and the vehicle for supporting the jacksheave, said support member being pivotal with respect to both the mower deck and the vehicle for shifting the position of the jacksheave to a position vertically between the output sheave and the mower deck sheaves as the mower deck shifts vertically.

18. The invention of claim 17, wherein said jacksheave pivots with the support member to assume a tilted position when the mower deck is shifted vertically.

19. The invention of claim 17, wherein said support member is coupled with the mower deck via a first pivotal connection and is coupled with the vehicle via a second pivotal connection.

20. The invention of claim 19, wherein:
   one of said pivotal connections also allows the support member to slide relative to said pivotal connection as the mower deck shifts vertically.

21. The invention of claim 20, wherein:
   said mower deck is coupled with the vehicle for pivotal motion about a pivot axis, said first and second pivotal connections are positioned fore and aft of the mower deck's pivot axis.

22. The invention of claim 17, wherein:
the support member is coupled with the mower deck via a hinge coupling which allows the support member to pivot with respect to the mower deck about a horizontal axis,
the support member is coupled with the vehicle via an arm member having a longitudinal axis extending from the support means, said arm member being received within an opening defined by the vehicle for sliding within the opening generally in the direction of the arm's longitudinal axis, said arm also being pivotable within the opening when the mower deck shifts with respect to the vehicle.

23. The invention of claim 17, and further comprising a swing arm coupled between the jacksheave and the support member for allowing the jacksheave to pivot with respect to the support member about a generally vertical axis.

24. A belt drive mechanism for transmitting power from a vehicle's power source to a mower deck coupled with the vehicle for vertical shifting, comprising:
a primary belt driven by the vehicle power source,
a jacksheave driven by the primary belt,
a secondary belt driven by the jacksheave and operatively engaged with mower deck sheaves, and
a support member for supporting the jacksheave, said support member having a first pivotal connection with the mower deck and a second pivotal connection with the vehicle.

25. The invention of claim 24, wherein:
one of said pivotal connections also allows the support member to slide relative to said pivotal connection as the mower deck shifts vertically.

26. The invention of claim 25, wherein:
said mower deck is coupled with the vehicle for pivotal motion about a generally horizontal pivot axis,
said first and second pivotal connections are positioned fore and aft of the mower deck's pivot axis.

27. The invention of claim 26, wherein:
an output sheave is operatively coupled with the power source for driving the primary belt, said output sheave having a fixed vertical position with respect to the vehicle,
said mower deck sheaves being vertically shiftable with the mower deck, said mower deck sheaves thereby having a plurality of vertical positions with respect to the vehicle and output sheave, and
the support member vertically shifts the jacksheave to a position between the vertical positions of the output sheave and the mower deck sheaves when the mower deck is shifted vertically.

28. The invention of claim 27, wherein said jacksheave pivots with the support member to assume a tilted position when the implement is shifted vertically.

29. The invention of claim 28, wherein:
said first pivotal connection further comprises a hinge coupling which allows the support member to pivot with respect to the mower deck about a horizontal axis,
said second pivotal connection further comprises an arm member having a longitudinal axis extending from the support member, said arm member being received within an opening defined by the vehicle for sliding within the opening generally in the direction of the arm's longitudinal axis, said arm also being pivotable within the opening when the mower deck shifts with respect to the vehicle.

30. The invention of claim 29, and further comprising a swing arm coupled between the jacksheave and the support member for allowing the jacksheave to pivot with respect to the support member about a generally vertical axis.

* * * * *